United States Patent [19]

Richert

[11] 4,184,088

[45] Jan. 15, 1980

[54] DETACHABLE HEAD APPLIANCE DRIVEN BY AN ELECTRIC MOTOR

[75] Inventor: Raymond Richert, Klagenfurt, Austria

[73] Assignee: U.S. Philips Corporation, New York, N.Y.

[21] Appl. No.: 842,106

[22] Filed: Oct. 14, 1977

[30] Foreign Application Priority Data

Nov. 26, 1976 [AT] Austria ................................ 8780/76

[51] Int. Cl.$^2$ ........................ H02K 33/00; B26B 19/04

[52] U.S. Cl. ........................................ 310/17; 310/29; 310/32; 30/43.92

[58] Field of Search ........................ 310/17, 19, 29, 32, 310/37, 46, 47, 50; 30/90, 43.92; 15/22 A; 128/41, 46, 49, 52

[56] References Cited

U.S. PATENT DOCUMENTS

| | | | |
|---|---|---|---|
| 2,351,623 | 6/1944 | Martin | 310/29 |
| 3,348,307 | 10/1967 | Beck et al. | 30/43.92 |
| 3,840,760 | 10/1974 | Boer | 310/37 X |
| 3,999,291 | 12/1976 | Boer | 30/43.92 |
| 4,030,573 | 6/1977 | Buzzi et al. | 30/43.92 X |

*Primary Examiner*—Mark O. Budd

*Attorney, Agent, or Firm*—Thomas A. Briody; William J. Streeter; Rolf E. Schneider

[57] ABSTRACT

In an apparatus which is driven by an electric motor, for example, a dry-shaving apparatus or the like, which consists of a basic appliance on which a structural unit equipped with a tool can be placed and which comprises an appliance element which performs a reciprocatory oscillating movement, which element is movably guided in the direction of the oscillating movement by means of springs, the springs are also used for cooperation with catches by means of which the structural unit is detachably secured to the basic appliance.

3 Claims, 4 Drawing Figures

DETACHABLE HEAD APPLIANCE DRIVEN BY AN ELECTRIC MOTOR

This invention relates to an apparatus driven by an electric motor, comprising a basic appliance which includes a drive section, a structural unit with a drivable tool, which unit is detachably secured to the basic appliance by at least one resilient latching means and at least one appliance element which performs a reciprocatory oscillating movement, on whose sides which face each other in the direction of the oscillating movement at least one spring acts with one of its two ends, which spring produces a force component in the direction of the oscillating movement, the other end of the spring bearing against a stationary abutment. Such an apparatus, described in U.S. Pat. No. 4,030,573 comprises two resilient latching means with leaf springs for detachably securing the structural unit to the basic appliance, which unit may comprise a massage tool, a nail polisher, a shaving head for shaving purposes and the like.

It is an object of the present invention to provide an apparatus of the indicated type, which is of particularly simple construction in respect of the resilient latching means. According to the invention at least one of the abutments is constituted by a catch which is movable in the direction of the oscillating movement against the action of the spring which engages with it, so as to secure the structural unit detachably to the basic appliance. In this way the springs already provided in the basic appliance, which cooperate with the appliance element which performs a reciprocatory oscillating movement, are also used to form the resilient latching means, so that separate springs for the above-mentioned purpose may be dispensed with.

For a particularly reliable fixation of the structural unit to the basic appliance, it is advantageous if the catch is constituted by a U-shaped bracket, whose two limbs have detents on their free ends with whose connecting member, which interconnects the two limbs, the spring engages.

Furthermore, it is desirable to provide adjusting means with which the spring force can be adjusted. Thus, it is possible to compensate for any undesired influence on the springs, which may arise because the catch has to cooperate with an appliance element whose dimensions lie within certain tolerance ranges; as a result of this, the catch may assume different positions, which in their turn give rise to different spring forces, which may affect the appliance element which performs a reciprocatory oscillating movement.

The invention will now be described with reference to the accompanying drawings, in which.

Figure 1:
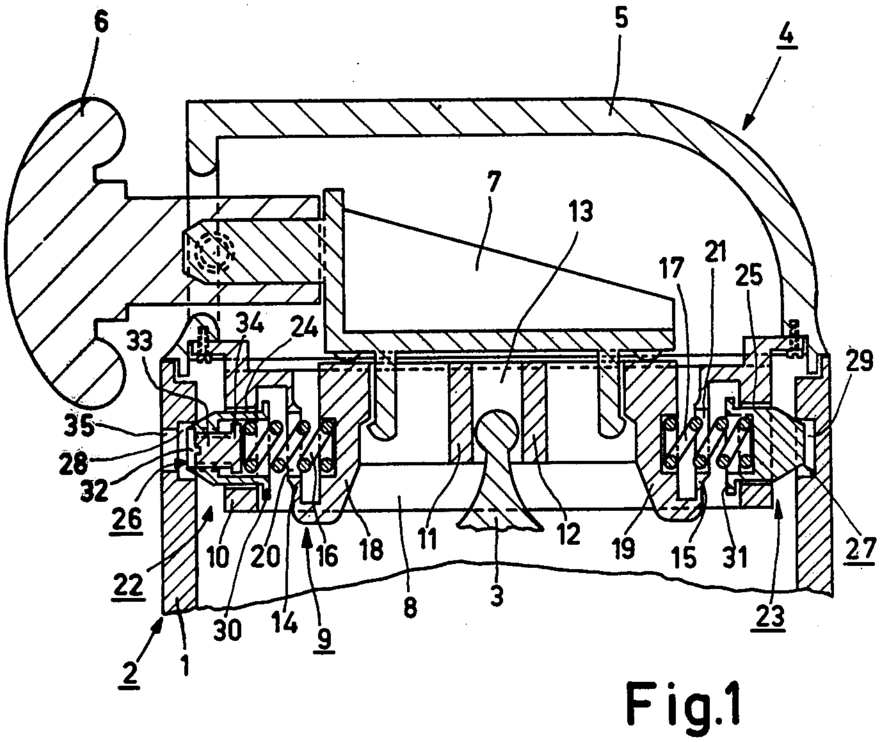
FIG. 1 is a cross-section of an apparatus in which the springs which serve to form the latching means are components of the structural unit which can be attached to the basic appliance.

In FIG. 1 the reference numeral 1 designates the housing of a basic appliance 2 which accommodates a drive section which is constituted by a vibrator motor, of which FIG. 1 only shows the free end of the armature lever 3 which performs a reciprocatory oscillating movement. Obviously, there could also be provided a drive section having a motor whose drive member performs a rotary movement, which is converted into a reciprocatory movement by eccentric means. The basic appliance 2 receives different structural units 4, which may differ from each other in respect of the type of tool. In the present embodiment the basic appliance cooperates with a structural unit which serves for massage purposes. However, it is for example also possible to place a shaving head onto the basic appliance, thus rendering the apparatus suitable for shaving purposes.

The structural unit 4 comprises a housing 5, from which a massage tool 6 projects, which can be fitted onto a support 7. The support 7 in its turn is placed on the drivable part 8 of an oscillating bridge 9, whose stationary part 10 is connected to the housing 5 of the structural unit 4. The drivable part 8 of the oscillating bridge takes the form of a frame and comprises two connecting members 11 and 12, which bound a gap 13 into which the free end of the armature lever 3 extends when the structural unit 4 is placed onto the basic appliance 2. For the parallel guidance and fixation of the drivable part 8 of the oscillating bridge 9 and the members 11 and 12 connected thereto, which are jointly driven by the armature lever 3 and constitute an appliance element which performs a reciprocatory oscillating movement, there are provided strip-shaped integral hinges 14 and 15 at the sides of the drivable part 8 which face each other in the direction of the oscillating movement, which hinges each are pivotally connected to the drivable part 8 at one end and to the stationary part 10 at the other end. For the parallel guidance and fixation of the drivable part 8 there are moreover provided two springs, in the present embodiment helical springs 16 and 17, which produce force components in the direction of the oscillating movement. With one of their ends, the springs 16 and 17 respectively bear against those sides 18 and 19 of the drivable part 8, which face each other in the direction of the oscillating movement, and with their other ends against the respective stationary abutments, passing through openings 20 and 21 in the integral hinges 14 and 15 respectively. Of course, it is also possible to use leaf springs instead of helical springs. It would also be possible to use a type of parallel guidance other than the oscillating bridge, for example, a form of a slide guidance. Alternatively, only springs may be used for the parallel guidance and fixation of the drivable appliance element.

The structural unit 4 placed on the basic appliance 2 is detachably secured to the basic appliance by means of two resilient latching means 22 and 23. For this purpose, in accordance with the invention, the abutments for the springs 16 and 17 on the stationary part 10 of the oscillating bridge 9 take the form of catches 26 and 27 which are movable in the direction of the oscillating movement in openings 24 and 25 formed in the stationary part 10 against which catches the springs 16 and 17 respectively bear with their ends which are remote from the drivable part 8 of the oscillating bridge. The wedge-shaped free ends of the catches 26 and 27 engage with recesses 28 and 29 formed in the housing 1 of the basic appliance 2, thus securing the structural unit 4 to the basic appliance 2. When the force of the springs 16 and 17 is overcome the structural unit 4 can simply be removed from the basic appliance 2 by hand, the catches 26 and 27 being moved against the action of the springs 16 and 17. Projections 30 and 31 on the catches 26 and 27 limit the movements of said catches under the influence of the springs 16 and 17 respectively, when the structural unit 4 is removed from the basic appliance 2.

In this way the springs 16 and 17 serve a dual purpose. They serve both for the parallel guidance and fixation of the appliance element which performs the reciprocatory oscillating movement and for exerting the force necessary for resiliently loading the catches which secure the structural unit to the basic appliance. Thus, separate springs for the latching means for securing the structural unit to the basic appliance may be dispensed with.

In the present embodiment the catch 26 is provided with adjusting means with which the force of the spring 16, and thus indirectly the force of the spring 17, can be adjusted. Said adjusting means consists of a screw 33 which is fitted in the hole 32 of the catch 26, which screw is provided with a washer 34, against which the relevant end of the spring 16 bears. In the housing 1 of the basic appliance 2 an opening 35 is formed near the recess 28, through which opening the screw 33 is accessible from the outside of the basic appliance. By turning the screw 33 in the catch 26 the spring 16 is tensioned to a lesser or greater extent, thus influencing its effect on the catch and also on the drivable appliance element. This is effective, because the parts involved in latching, namely the recess 28 formed in the housing 1 of the basic appliance and also the catch itself, may exhibit certain dimensional tolerances, which may result in different positions of the catch, so that the tension of the spring 16 is influenced, which in its turn affects the operation of the drivable part 8. Now such influences can simply be compensated for by adjusting the screw 33 accordingly. Of course the catch 27 could also be provided with such adjusting means. Finally, it is also readily possible to render the part of the housing of the basic appliance which cooperates with the catch adjustable in a corresponding manner. If required, it is also possible to adjust the amplitude of the reciprocatory oscillating movement performed by the drivable appliance element, because this amplitude also depends on the forces exerted by springs 16 and 17.

Figure 2:
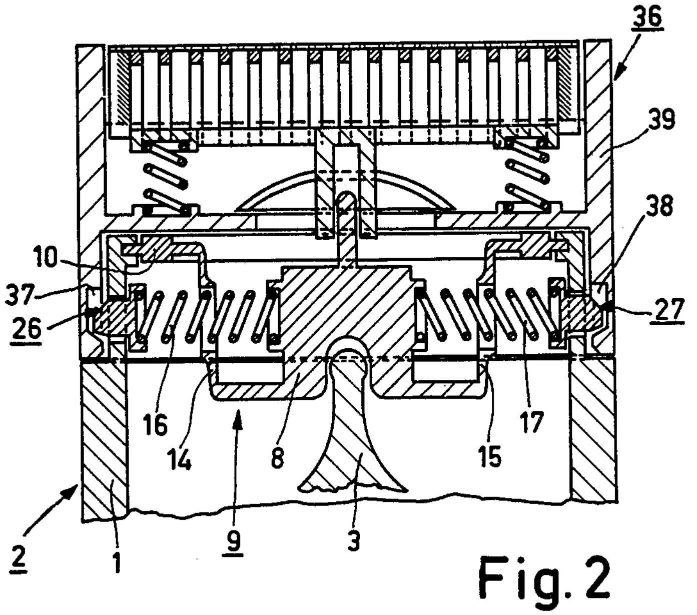
FIG. 2 is a cross-section of a modified apparatus which the springs which serve to form the latching means are components of the basic appliance.

In the modification of FIG. 2 the oscillating bridge 9 and the springs 16 and 17 form part of the basic appliance 2. Consequently, the catches 26 and 27, with which the springs 16 and 17 respectively engage with their ends which are remote from the drivable part 8 of the oscillating bridge, also form part of the basic appliance. On this basic appliance a shaving head 36 may be placed for shaving purposes, which in a similar way as the structural unit 4 in the embodiment of FIG. 1, is detachably secured by the catches 26 and 27 under the influence of the respective springs 16 and 17, the catches engaging with corresponding recesses 37 and 38 in the housing 39 of the shaving head. Thus, the springs 16 and 17 also have a dual function in this case.

Figure 3:
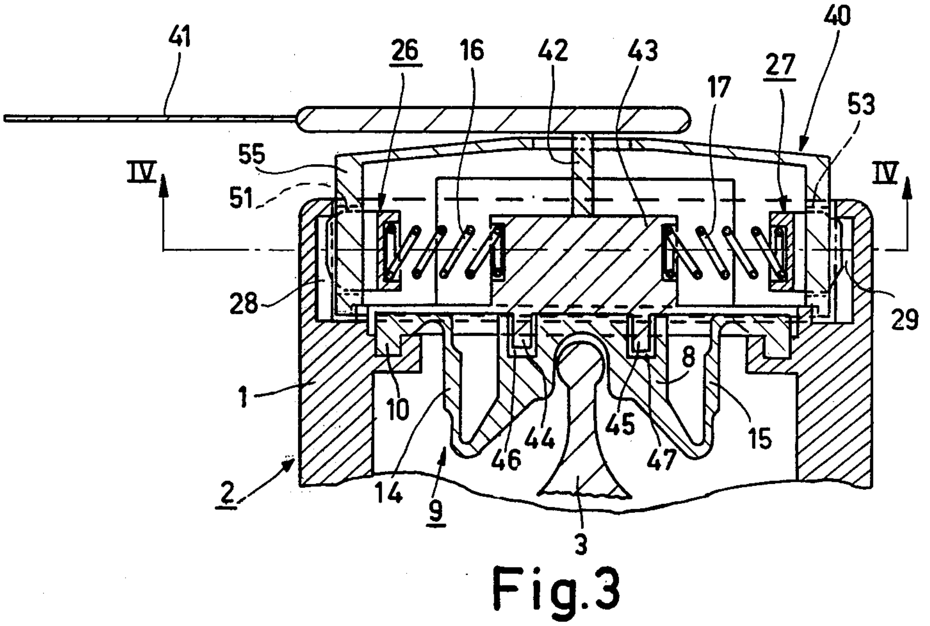
FIG. 3 is a cross-section, taken on the line III—III of FIG. 4, of a further modified apparatus in which, as in the embodiment of FIG. 1, the springs which serve to form the latching means are components of the structural unit which can be attached to the basic appliance.
Figure 4:
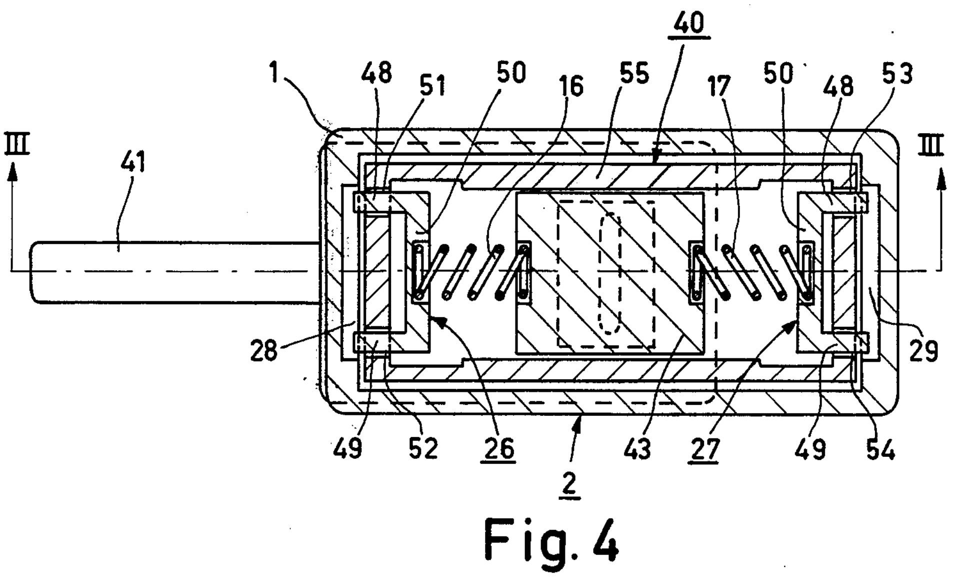
FIG. 4 is a cross-section, taken on the line IV—IV in FIG. 3.

In the further modification of FIGS. 3 and 4 the oscillating bridge 9 forms part of the basic appliance 2, whilst the springs 16 and 17 form part of a structural unit 40 which can be placed on the basic appliance. In the present case the tool of this structural unit is a nail polisher 41, which via a connecting member 42 is connected to a reciprocative carrier part 43, which is mounted so as to be reciprocative in the direction of the oscillating movement by means of the springs 16 and 17 in the structural unit. When the structural unit 40 is placed onto the basic appliance 2 this carrier part 43 is coupled to the oscillating bridge 9 via the projections 44 and 45 on said part, said projections engaging with corresponding recesses 46 and 47 in the drivable part 8 of the oscillating bridge. However, without an oscillating bridge, it is also readily possible to couple the carrier part 43 directly to the armature lever 3, when the structural unit 40 is placed on the basic appliance 2.

The springs 16 and 17 again engage with catches 26 and 27 respectively with their ends which are remote from the carrier part 43. In the present embodiment each of these catches is constituted by a U-shaped bracket whose limbs 48 and 49 include detents on their free ends and with whose connecting member 50, which interconnects the two limbs, the associated springs 16 and 17 respectively engage. The limbs 48 and 49 pass through openings 51, 52 and 53, 54 respectively in the housing 55 of the structural unit 40, in which openings they are guided in the direction of the oscillating movement. When the structural unit is removed from the basic appliance the connecting members 50 of the two catches limit the movement of the catches under the influence of the springs 16 and 17. For detachably securing the structural unit to the basic appliance the detents, which project from the housing 55 of the structural unit, again cooperate with corresponding recesses 28 and 29 in the housing 1 of the basic appliance 2. Catches of this type ensure that the structural unit is secured to the basic appliance in a particularly reliable manner.

In this case the springs 16 and 17 also have a double function, because they serve both for rendering the drivable appliance element movable in the direction of the oscillating movement and for detachably securing the structural unit which can be placed on the basic appliance. Obviously, it is also possible to provide only one spring which cooperates with an adjustable catch and to provide a further non-resilient latching means. On the other hand, if more than two springs cooperate with the appliance element which performs a reciprocatory oscillating movement, it is of course also possible to use these springs so that they jointly constitute the latching means. As can be seen, a series of modifications of the embodiments described hereinbefore is possible within the scope of the invention.

What is claimed is:

1. An apparatus driven by an electric motor, comprising a basic appliance which includes a drive section, a structural unit with a drivable tool, at least one appliance element which performs a reciprocatory oscillating movement, a spring having one end biassing the appliance element in the direction of the oscillating movement, and a catch means bearing against the other end of the spring and being movable in the direction of the oscillating movement against the action of the spring which engages it for detachably securing the structural unit to the basic appliance.

2. An apparatus as claimed in claim 1, where the catch is constituted by a U-shaped bracket, whose two limbs have detents at their free ends and a connecting member which interconnects the two limbs and is engaged by the spring.

3. An apparatus as claimed in claim 1, further comprising adjusting means with which the spring force is adjustable.

* * * * *